US011529803B2

United States Patent
Wang et al.

(10) Patent No.: US 11,529,803 B2
(45) Date of Patent: Dec. 20, 2022

(54) SYSTEM FOR MANUFACTURING AN INDUCTOR CORE

(71) Applicant: General Electric Company, Schenectady, NY (US)

(72) Inventors: Ruxi Wang, Cohoes, NY (US); Manoj Ramprasad Shah, Latham, NY (US); Ramanujam Ramabhadran, Niskayuna, NY (US); Yanzhe Yang, Mason, OH (US)

(73) Assignee: General Electric Company, Schenectady, NY (US)

( * ) Notice: Subject to any disclaimer, the term of this patent is extended or adjusted under 35 U.S.C. 154(b) by 182 days.

(21) Appl. No.: 16/711,175

(22) Filed: Dec. 11, 2019

(65) Prior Publication Data

US 2020/0114640 A1 Apr. 16, 2020

Related U.S. Application Data

(62) Division of application No. 15/258,893, filed on Sep. 7, 2016, now Pat. No. 10,525,690.

(51) Int. Cl.
*B33Y 10/00* (2015.01)
*B33Y 30/00* (2015.01)
(Continued)

(52) U.S. Cl.
CPC ............ *B33Y 30/00* (2014.12); *B29C 64/209* (2017.08); *B29C 64/336* (2017.08);
(Continued)

(58) Field of Classification Search
CPC ..... B33Y 30/00; B33Y 10/00; H01F 17/0013; H01F 17/04; H01F 17/043; H01F 41/0246; H01F 41/046
See application file for complete search history.

(56) References Cited

U.S. PATENT DOCUMENTS 1,803,868 A 5/1931 Porter
3,191,106 A 6/1965 Baermann
(Continued)

FOREIGN PATENT DOCUMENTS

CN 203931737 U 11/2014
CN 104441667 A 3/2015
(Continued)

OTHER PUBLICATIONS

Cui, Han; "Constant-Flux Inductor with Enclosed-Winding Geometry for Improved Energy Density"; Virginia Polytechnic Institute and State University; Jun. 28, 2013.
(Continued)

Primary Examiner — Jeffrey T Carley
(74) *Attorney, Agent, or Firm* — Dority & Manning, P.A.

(57) ABSTRACT

A system includes a magnetic material supply for regulating a magnetic material flow rate of a magnetic material and a binder material supply for regulating a binder material flow rate of a binder material. A nozzle is configured for depositing a deposition mixture of the magnetic material and the binder material on a surface and a preheater is configured to preheat the deposition mixture before depositing on the surface. A controller is in operative communication with the magnetic material supply, the binder material supply, and the preheater. The controller is configured to receive an inductor core design file that represents a geometry and a magnetic permeability distribution of an inductor core, move the nozzle to one or more deposition locations, and adjust the magnetic material flow rate to the binder material flow rate to achieve a deposition mixture having a desired magnetic permeability at the deposition locations.

11 Claims, 7 Drawing Sheets

(51) Int. Cl.

| | | |
|---|---|---|
| *B29C 70/88* | (2006.01) | |
| *H01F 17/00* | (2006.01) | |
| *H01F 17/04* | (2006.01) | |
| *H01F 27/22* | (2006.01) | |
| *H01F 41/04* | (2006.01) | |
| *B29C 64/209* | (2017.01) | |
| *H01F 41/02* | (2006.01) | |
| *B29C 64/336* | (2017.01) | |
| *B33Y 80/00* | (2015.01) | |
| *H01F 27/28* | (2006.01) | |

(52) U.S. Cl.
CPC ............ *B29C 70/882* (2013.01); *B33Y 10/00* (2014.12); *B33Y 80/00* (2014.12); *H01F 17/0013* (2013.01); *H01F 17/04* (2013.01); *H01F 17/043* (2013.01); *H01F 27/22* (2013.01); *H01F 41/0246* (2013.01); *H01F 41/046* (2013.01); *H01F 27/2871* (2013.01)

(56) References Cited

U.S. PATENT DOCUMENTS

| | | | |
|---|---|---|---|
| 3,287,678 A | 11/1966 | Takashi et al. | |
| 3,414,857 A | 12/1968 | Barden | |
| 4,529,956 A | 7/1985 | Atherton | |
| 4,911,815 A | 3/1990 | Kamei et al. | |
| 4,943,793 A | 7/1990 | Ngo et al. | |
| 5,472,661 A | 12/1995 | Gay | |
| 5,726,615 A | 3/1998 | Bloom | |
| 5,843,565 A | 12/1998 | Davies et al. | |
| 6,778,058 B1 | 8/2004 | Branchevsky | |
| 7,221,251 B2 | 5/2007 | Menegoli et al. | |
| 7,972,650 B1 * | 7/2011 | Church | H01L 25/0657 427/117 |
| 8,138,876 B2 * | 3/2012 | Ding | H01F 21/005 336/200 |
| 9,230,726 B1 | 1/2016 | Parker et al. | |
| 9,987,777 B2 | 6/2018 | Huang | |
| 2005/0057335 A1 | 3/2005 | Sia et al. | |
| 2008/0003378 A1 | 1/2008 | Serafin et al. | |
| 2008/0107867 A1 | 5/2008 | Miekka | |
| 2010/0001823 A1 | 1/2010 | Kawari | |
| 2010/0256791 A1 | 10/2010 | Spicer et al. | |
| 2010/0273103 A1 | 10/2010 | Baba et al. | |
| 2013/0187255 A1 | 7/2013 | Wang et al. | |
| 2014/0002228 A1 | 1/2014 | Hatanaka et al. | |
| 2014/0231266 A1 | 8/2014 | Sherrer et al. | |
| 2015/0035637 A1 | 2/2015 | Maxim et al. | |
| 2015/0035638 A1 * | 2/2015 | Stephanou | H01F 41/041 336/200 |
| 2015/0108677 A1 * | 4/2015 | Mark | B29C 64/106 425/375 |
| 2015/0137931 A1 | 5/2015 | Mano et al. | |
| 2016/0011540 A1 * | 1/2016 | Yamaoka | G03G 15/087 399/262 |
| 2016/0172741 A1 * | 6/2016 | Panat | H01F 27/24 29/600 |
| 2017/0239892 A1 * | 8/2017 | Buller | B23K 15/0086 |
| 2017/0252876 A1 | 9/2017 | Bruck | |
| 2018/0158604 A1 | 6/2018 | Craft et al. | |

FOREIGN PATENT DOCUMENTS

| | | | | |
|---|---|---|---|---|
| CN | 106469596 A | * | 3/2017 | ............ B22F 10/10 |
| EP | 3208077 A1 | * | 8/2017 | ............ B22F 10/20 |
| WO | 2015000197 A1 | | 1/2015 | |
| WO | 2016036854 A1 | | 3/2016 | |

OTHER PUBLICATIONS

Liang, Wei et al.; "3D Printed Air Core Inductors for High Frequency Power Converters"; Energy Congress and Exposition; Sep. 14-18, 2014.

Hoerber, J., et al.; "Approaches for Additive Manufacturing of 3D Electronic Applications"; Variety Management in Manufacturing—Proceedings of the 47th CIRP Conference on Manufacturing Systems; Dec. 2014.

Optomec; "Production Grade 3D Printing"; 2014; http://www.optomec.com/.

Wu, Sung-Yueh, et al.; "3D-printed microelectronics for integrated circuitry and passive wireless sensors"; Microsystems & Nanoengineering; Article No. 15013; Jul. 20, 2015.

Virginia Tech; "Additive manufacturing of magnetic components for power electronics integration"; Center for Power Electronics Systems; 2016; http://www.cpes.vt.edu/public/nugget/2016_D4.3.php.

* cited by examiner

SYSTEM FOR MANUFACTURING AN INDUCTOR CORE

CROSS-REFERENCE TO RELATED APPLICATION

This application is a divisional of, and claims priority to, U.S. patent application Ser. No. 15/258,893, entitled "ADDITIVE MANUFACTURING-BASED LOW-PROFILE INDUCTOR", filed Sep. 7, 2016, which is herein incorporated by reference in its entirety.

BACKGROUND

The subject matter disclosed herein relates to magnetic components in electronic circuits, and specifically to low-profile inductors.

Typically, the magnetic components of an electronic circuit are the largest components by volume, the tallest components, and the heaviest components. As electronic devices containing these magnetic components (e.g., smartphones, tablets, laptop computers, etc.) shrink in size and weight, volume within these devices and space on circuit boards within the devices are at a premium. Accordingly, techniques for manufacturing inductors with lower heights, lower weights, and custom form factors without sacrificing performance (e.g., inductance or resistance) would be useful in electronic devices.

BRIEF DESCRIPTION

Certain embodiments commensurate in scope with the original claims are summarized below. These embodiments are not intended to limit the scope of the claims, but rather these embodiments are intended only to provide a brief summary of possible forms of the claimed subject matter. Indeed, the claims may encompass a variety of forms that may be similar to or different from the embodiments set forth below.

In one embodiment, a core includes a first layer, a second layer, and a third layer. The first layer has a first surface, a second surface, and a first recessed pattern extending from the second surface of the first layer toward the first surface of the first layer. The second layer has a third surface, a fourth surface, a second recessed pattern extending from the third surface of the second layer toward the fourth surface of the second layer, and a third recessed pattern extending from the fourth surface of the second layer toward the third surface of the second layer. The third layer has a fifth surface, a sixth surface, and a fourth recessed pattern extending from the fifth surface of the third layer toward the sixth surface of the third layer. The second layer is disposed between the first and third layers such that the second surface of the first layer faces the third surface of the second layer and the fourth surface of the second layer faces the fifth surface of the third layer. The first and second recessed patterns correspond to one another and are configured to receive a coil. The first, second, and third layers have non-uniform magnetic permeabilities.

In a second embodiment, a system includes a computing device, a controller, and a preheater. The computing device includes a memory, wherein the memory is configured to store a file that represents a geometry and a magnetic permeability distribution of an inductor core. The controller communicates with the computing device, controls a first flow rate of a magnetic material from a magnetic material supply to a nozzle, and controls a second flow rate of a binder material from a binder material supply to the nozzle. The preheater is configured to preheat the magnetic material and the binder material before the magnetic material and the binder material are deposited on a surface. The magnetic material and the binder material are mixed according to a ratio based at least in part on the file that represents the geometry and the magnetic permeability distribution of the inductor core.

In a third embodiment, a method of manufacturing an inductor core includes controlling a first flow rate of a magnetic material to a nozzle and a second flow rate of a binder material to the nozzle, preheating the magnetic material and the binder material, mixing the magnetic material and the binder material according to a ratio based on a magnetic permeability distribution of the inductor core, and depositing the magnetic material and the binder material on a surface. The inductor core includes a first layer having a first surface, a second surface, and a first recessed pattern extending from the second surface of the first layer toward the first surface of the first layer, a second layer having a third surface, a fourth surface, a second recessed pattern extending from the third surface of the second layer toward the fourth surface of the second layer, and a third recessed pattern extending from the fourth surface of the second layer toward the third surface of the second layer, and a third layer having a fifth surface, a sixth surface, and a fourth recessed pattern extending from the fifth surface of the third layer toward the sixth surface of the third layer, wherein the second layer is disposed between the first layer and the third layer.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Electronic devices, such as smart phones, tablet computers, laptop computers, calculators, handheld gaming devices, etc. may include one or more circuit boards, which include various electronic components, such as inductors, capacitors, and resistors. Inductors are relatively larger components by volume and by weight, and are also typically the tallest components on the circuit board, as compared to other components on the circuit board. As these electronic devices shrink in size and become more compact, space within the device housing and space on the one or more circuit boards are limited. An inductor includes a conductive coil or winding, which may be wrapped around a magnetic core. By utilizing additive manufacturing (e.g., three-dimensional printing) technologies, a core may be manufactured with a non-uniform magnetic permeability distribution (e.g., a non-uniform magnetic permeability that varies from location to location within the core). As will be discussed in more detail below, a desired magnetic permeability of the core at a given location may be achieved by varying the ratio of a binder material (e.g., epoxy) and a magnetic material (e.g., magnetic powder, magnetic ink, or some other magnetic material) during manufacture of the core. As a result, inductor cores with desires permeability distributions (e.g., relatively higher permeability toward the edges and relatively lower permeability toward the center) enable inductors with smaller form factors, but without corresponding reductions in performance, enabling a reduction in form factor of the electronic device containing the inductor.

Figure 1:
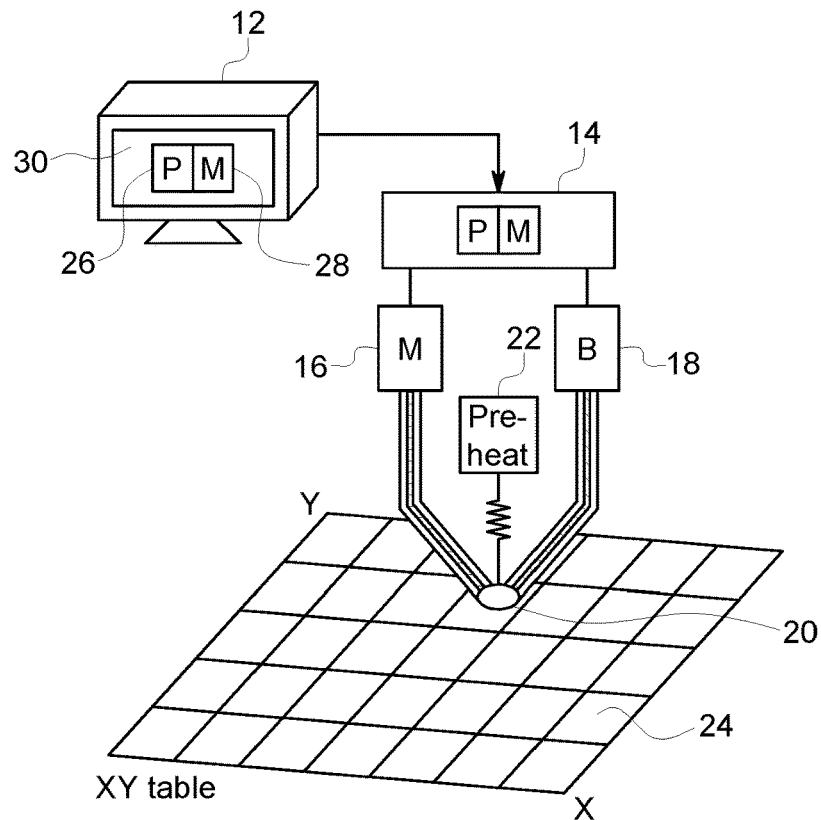
FIG. 1 is a schematic of an additive manufacturing system for manufacturing inductor cores to be used in on electronic circuits, in accordance with an embodiment.

FIG. 1 is a schematic of an embodiment of an additive manufacturing or three-dimensional printing system 10 for manufacturing inductor cores for use in electronic circuits. In the illustrated embodiment, the system 10 includes a computing device 12, which may store a file (e.g., CAD, OBJ, STL, DXF, AMF, etc.) representative of the core design. The computing device 12 may be in communication with a controller 14, which may control material flow rates from a magnetic material supply 16 (e.g., magnetic powder or magnetic ink) and a binder material supply 18 (e.g., epoxy) to a nozzle 20. As the materials from the magnetic material supply 16 and the binder material supply 18 approach the nozzle 20, the materials are heated by a preheater 22. The materials may then be mixed and deposited onto a surface, such as the XY table 24, via a nozzle or like component that may be coupled to the preheater 22. Materials from the magnetic material supply 16 and the binder material supply 18 may be mixed in ratios corresponding to the desired magnetic permeability or density and deposited on the XY table 24 in layers, which combine to form the core.

As illustrated, the computing device 12 includes a processor 26 and a memory component 28. The processor 26 may analyze data, execute programs, execute instructions, and control the operating parameters of the additive manufacturing system 10. The memory component 28 may be any non-transitory computer readable medium. The memory component 28 may store data, processor instructions, programs, optimization algorithms, lookup tables, models, and the like, including processor instructions for implementing the present approaches discussed herein.

In some embodiments, the computing device 12 may include an operator interface 30, which may include a display for displaying information to a user, as well as devices for receiving inputs from a user (e.g., keyboard, mouse, track pad, buttons, dials, touch screen, etc.). A file representative of a core design (e.g., CAD, OBJ, STL, DXF, AMF, etc.) may be stored on the memory component 28 of the computing device 12. The file may be representative of the core design in terms of geometry, density, magnetic permeability, and some other quality. In some embodiments, the computing device 12 may generate the representative file (e.g., via a software program). In other embodiments, the representative file may be generated on another computing device and transferred to the computing device 12 of the additive manufacturing or three-dimensional printing system 10. The computing device 12 is in communication with the controller 14, which controls the material flow rates out of the magnetic material supply 16 and the binder material supply 18 (e.g., via valves). For example, the computing device 12 may receive a desired ratio, or determine the desired ratio based on the representative file. The computing device 12 or the controller 14 may then determine the flow rates from the magnetic material supply 16 and the binder material supply 18 based on the desired ratios. The computing device 12 may provide a signal to the controller 14 indicative of a desired ratio of magnetic material to binder material. The controller 14 may then send commands to the magnetic material supply 16 and the binder material supply 18 to produce magnetic material and binder material at desired flow rates. In some embodiments, the computing device 12 and the controller 14 may be included in the same housing. In some embodiments the functions of the computing device 12 and the controller 14 may be performed by the same device.

The magnetic material and the binder material may be heated by the preheater 22 as the respective materials flow from the magnetic material supply 16 and the binder material supply 18 to the nozzle 20. The preheater 22 may be any device that may heat the magnetic material and the binder material via conduction, radiation, or convection. For example, the preheater 22 may be a coil, a light source, a resistive element, laser, etc. The magnetic material and the binder material may be mixed prior to exiting the nozzle 20, and the mixed material may be deposited onto the surface (e.g., the XY table 24). The mixed material has a ratio of magnetic material to binder material that corresponds to the desired magnetic permeability values at the deposit location. As multiple layers are deposited on the XY table 24, a core is formed having the desired magnetic permeability distribution (e.g., higher permeability toward the edges, than toward the center).

In the illustrated embodiment, the additive manufacturing system 10 is a powder fed directed energy deposition system, in which the magnetic material supply 16 and the binder material supplies 18 provide powdered materials to the focal point of the preheater 22 (e.g., a laser beam), which melts the material mixture. As each layer is completed, the nozzle 20 and preheater 22 move vertically upward and begin depositing the next layer. In some embodiments, the deposition of layers may take place in a hermetically sealed chamber filled with an inert or shielding gas. Such techniques may shield the melt pool from atmospheric oxygen for better control of material properties. However, the disclosed techniques may be used with extrusion-type additive manufacturing methods (e.g., fused deposition modeling, fused filament fabrication, robocasting, extrusion deposition, etc.). Additionally, application of the disclosed techniques to other types of additive manufacturing methods (e.g., stereolithography, digital light processing, powder bed printing, inkjet head printing, electron beam melting, selective laser melting, selective heat sintering, selective laser sintering, direct metal laser sintering, laminated object manufacturing, electron beam freeform fabrication, etc.) may be possible.

Figure 2:
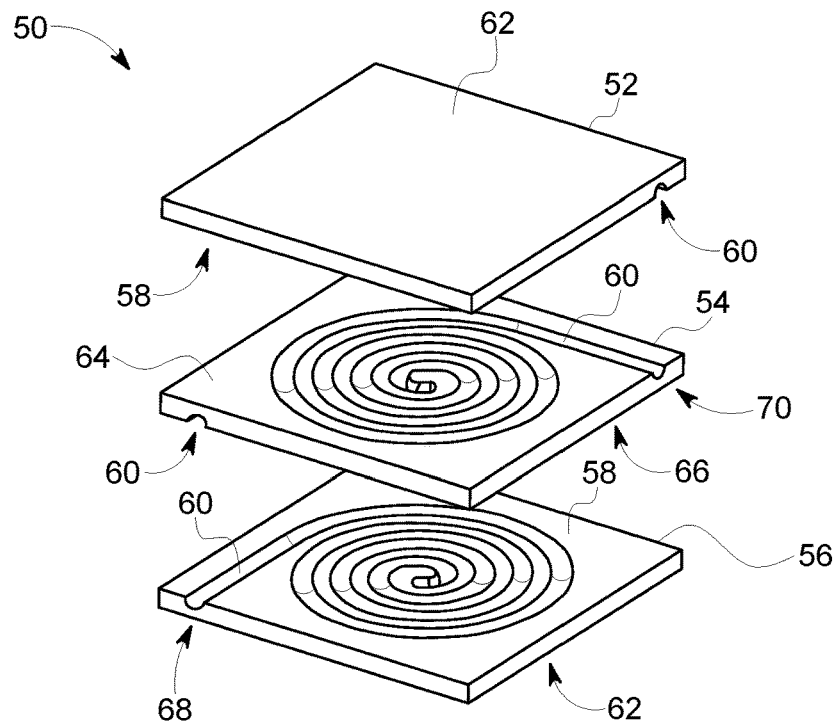
FIG. 2 is an exploded perspective view of an example of the inductor core produced by the additive manufacturing system of FIG. 1, in accordance with an embodiment.

FIG. 2 is an exploded perspective view of one embodiment of a core 50 produced by the additive manufacturing system 10 of FIG. 1. As illustrated, the core 50 includes a top layer 52, a middle layer 54, and a bottom layer 56. It should be understood, however, that the core 50 shown in FIG. 2 may include a different number of layers. For example, other embodiments of the core 50 may include a top layer 52, a bottom layer 56, and 2 or more middle layers 54. Similarly, in some embodiments, the core 50 may include just a top layer 52 and a bottom layer 56. Use of the terms "top layer" and "bottom layer" are used for convenience and not intended to impose an orientation on the core 50. For example, the core 50 may be oriented such that the top layer 52 and the bottom layer 56 may be disposed on either side of the core 50 rather than on the top and the bottom of the core 50. Accordingly, in some embodiments, the core 50 may be rotated 180 degrees from the view shown in FIG. 2 such that the top layer 52 is disposed on the bottom of the core 50 and the bottom layer 56 is disposed on the top of the core 50.

As shown, the interior surfaces 58 of the top layer 52 and the bottom layer 56 may include a recessed pattern 60. The recessed pattern 60 extends from the interior surface 58 toward the exterior surface 62. In the illustrated embodiment, the recessed pattern 60 has a spiral pattern and a semi-circular cross-section. However, it should be understood that other pattern shapes and cross sections (e.g., triangular, square, pentagonal, hexagonal, octagonal, or any other shape) may be possible. The recessed pattern 60 in the top layer 52 may or may not correspond to the recessed pattern in the bottom layer 56. For example, the recessed pattern 60 in the top layer 52 may be the same, similar to, or entirely different from the recessed pattern in the bottom layer 56.

The middle layer 54 includes a top surface 64 and a bottom surface 66. As with the top layer 52 and the bottom layer 56, use of the terms "top surface" and "bottom surface" are used for convenience and not intended to impose an orientation on the middle layer 54. As illustrated, the top surface 64 of the middle layer 54, which faces the interior surface 58 of the top layer 52, includes a recessed pattern 60 that has a spiral shape, a semi-circular cross-section, and corresponds to the recessed pattern 60 in the interior surface 58 of the top layer 52. That is, when the top surface 64 of the middle layer 54 and the interior surface 58 of the top layer 52 are placed adjacent to each other, the recessed patterns 60 align to form a spiral-shaped passageway having a circular cross-section. As will be shown and discussed with regard to FIG. 6, when the inductor is assembled, the coil occupies the volume created by the recessed pattern 60.

In embodiments with multiple middle layers 54, the recessed pattern 60 in the top surface 64 of each middle layer 54 may match a recessed pattern 60 in the surface that the top surface 64 faces. For example, if the top surface 64 of a middle layer 54 faces the bottom surface 66 of another middle layer 54, the two facing surfaces 64, 66 may have corresponding recessed patterns. Similarly, the bottom surface 66 of the middle layer 54 includes a recessed pattern 60 that corresponds to the recessed pattern 60 in the interior surface 58 of the bottom layer 56. In embodiments with multiple middle layers 54, the recessed pattern 60 on the bottom surface 66 of one middle layer 54 may correspond to the recessed pattern 60 on the top surface 64 of another middle layer 54, or to the recessed pattern 60 on the interior surface 58 of the bottom layer 56.

As previously discussed, in the illustrated embodiment, the recessed pattern 60 has a spiral pattern and a semi-circular cross-section. However, it should be understood that other pattern shapes and cross sections (e.g., triangular, square, pentagonal, hexagonal, octagonal, or any other shape) may be possible. Furthermore, in some embodiments, such as those in which the recessed pattern has a rectangular cross section, the recessed pattern may only be on one surface in a pair of mating surfaces may include a recessed pattern. For example, in some embodiments, the middle layer may include recessed patterns 60 in the top and bottom surfaces 64, 66 having a rectangular cross section. In such an embodiment, the recessed patterns may be deeper than a height of the coil such that the coil can lie entirely within the recess. In such an embodiment, the interior surfaces 58 of the top and bottom layers 52, 56 may not include recessed patterns 60. That is, the interior surfaces 58 of the top and bottom layers 52, 56 may be flat surfaces that enclose the recessed patterns 60 of the middle layer 54.

The middle layer 54 may include one or more through-holes (shown in FIG. 6) connecting the recessed pattern 60 in the top surface 64 to the recessed pattern 60 in the bottom surface 66 such that a first coil may extend from an entrance 68, through the passage formed by the recessed patterns 60 in the interior surface 58 of the bottom layer 56 and the bottom surface 66 of the middle layer 54, and through the middle layer 54. The first coil may contact a second coil that extends through the passage formed by the recessed patterns 60 in the top surface 64 of the middle layer 54 and the interior surface 58 of the top layer 52, and out through the exit 70. In embodiments having multiple middle layers 54, each middle layer may include two through holes. For example, each middle layer 54 may have a first through-hole out near the edge of the middle layer 54 and a second through-hole near the center of the middle layer 54.

Figure 3:
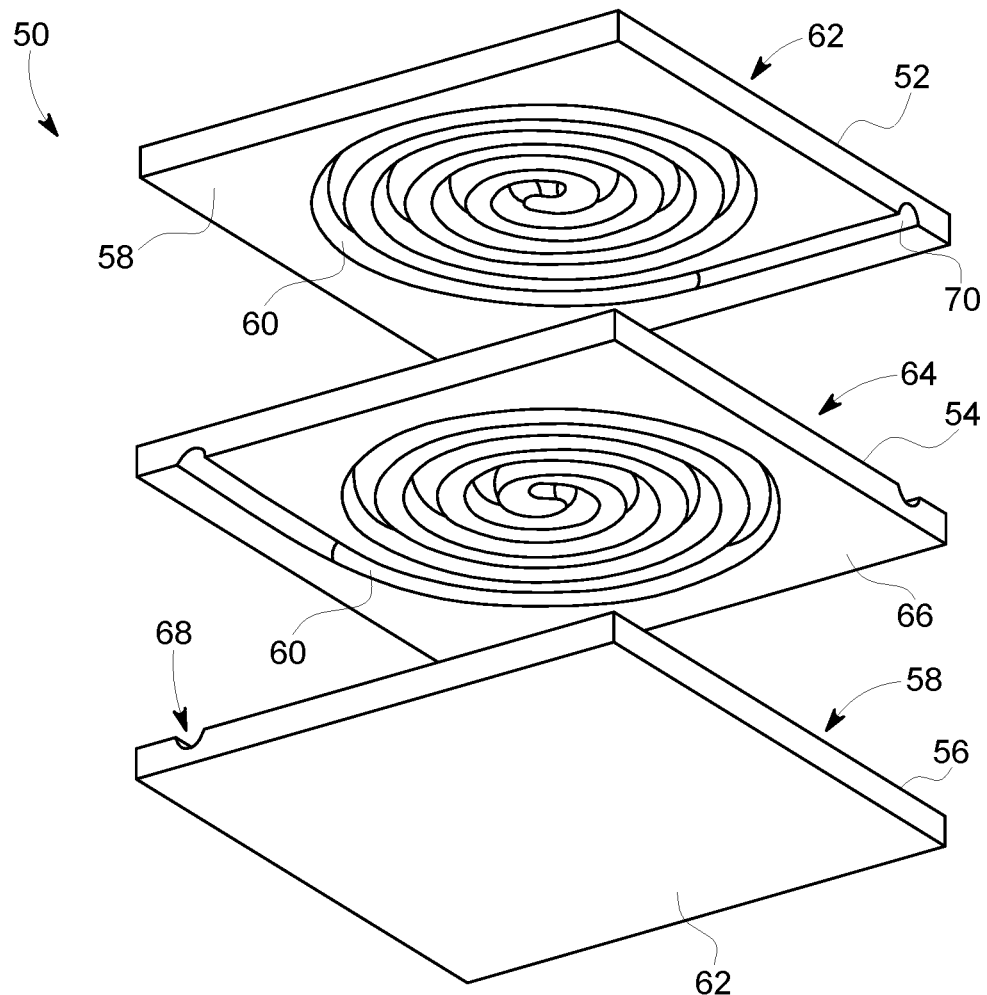
FIG. 3 is an exploded perspective view of the example of the inductor core shown in FIG. 2, in accordance with an embodiment.

FIG. 3 is an exploded perspective view of one embodiment of the core 50 shown in FIG. 2. FIG. 3 is from a different perspective than FIG. 2 such that the interior surface 58 of the top layer 52, the bottom surface 66 of the middle layer 54, and the exterior surface 62 of the bottom layer 56 can be seen. As described with regard to FIG. 2, the top layer 52 includes the recessed pattern 60, which extends from the interior surface 58 of the top layer 52 toward the exterior surface 62 of the top layer 52. The recessed pattern 60 corresponds to (e.g., mirrors) the recessed pattern 60 on the top surface 64 of the middle layer (shown in FIG. 2) to receive a coil.

Similarly, the middle layer 54 includes the recessed pattern 60, which extends from the bottom surface 66 of the middle layer 54 toward the top surface 64 of the middle layer 54. The recessed pattern 60 corresponds to (e.g., mirrors) the recessed pattern 60 on the interior surface 58 of the bottom 56 layer (shown in FIG. 2) to receive a coil. As illustrated, the recessed patterns 60 have a semi-circular cross-section and are generally spiral in shape. However, other cross sections and shapes are envisaged.

Though not shown in FIGS. 2 and 3, the exterior surfaces of the top layer 52 and the bottom layer 56 may include features, such as bumps or fins, to increase surface area and to aid in heat dissipation (e.g., heat sinks). Examples of such features are shown and described in more detail with regard to FIGS. 7 and 8. Manufacturing the core by additive manufacturing techniques, rather than traditional manufacturing methods, makes the addition of such features simple and cost effective. In some embodiments, the features may be disposed over the entirety of the exterior surfaces 62. In other embodiments, the features may only occupy part of the exterior surfaces 62. Based on the design of the circuit board on which the inductor will be installed, the features may be disposed in specific locations on the core 50 in order to give the inductor a form factor that does not interfere with other components on the circuit board.

Figure 4:
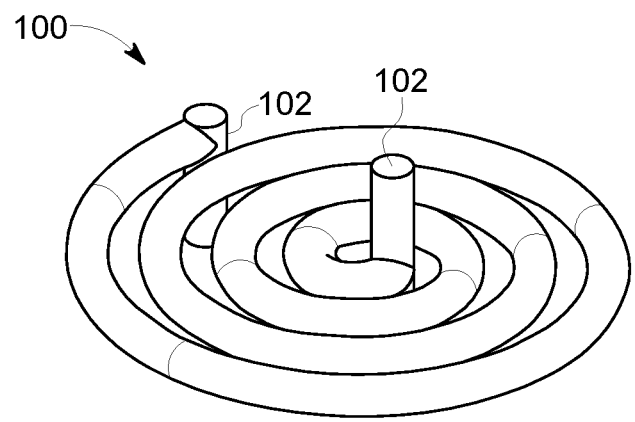
FIG. 4 is a perspective view of an example of a coil, in accordance with an embodiment.

FIG. 4 is a perspective view of one embodiment of a coil 100. As discussed with regard to FIG. 2, the coil 100 may extend through the passageway formed by the recessed patterns 60 in two facing surfaces (e.g., the interior surface 58 of the bottom layer 56 and the bottom surface 66 of the middle layer 54 or the top surface 64 of the middle layer 54 and the interior surface 58 of the top layer 52). In the illustrated embodiment, the coil 100 has a circular cross section and a generally spiral shape, corresponding to the recessed patterns 60 in the various layers 52, 54, 56 of the core 50. As with the recessed patterns 60, other shapes and cross sections (e.g., triangular, square, pentagonal, hexagonal, octagonal, or any other shape) may be possible.

The coil 100 includes one or more vertical portions 102, which extend vertically upward or downward, transverse to the plane of the spiral. In the illustrated embodiment, the coil includes a vertical portion 102 at either end of the coil 100, one vertical portion 102 toward the exterior of the coil 100 and one vertical portion 102 toward the interior of the coil 100. However, in some embodiments, the coil 100 may only include a single vertical portion 102 (e.g., the vertical portion 102 toward the interior of the coil 100). The vertical portions may extend through through-holes in the various layers 52, 54, 56 of the core 50 to contact other coils 100 disposed within the core 50.

The coil 100 shown in FIG. 4 is a solid metal coil 100. The coil 100 may be printed (e.g., via the additive manufacturing system 10 shown in FIG. 1, or some other additive manufacturing system), cast, molded, forged, extruded, stamped, machined, some combination thereof, or made by some other manufacturing process. The coil 100 may be made of copper, silver, gold, aluminum, brass, zinc, nickel, iron, tin, alloys thereof, or any other conductive metal.

Figure 5:
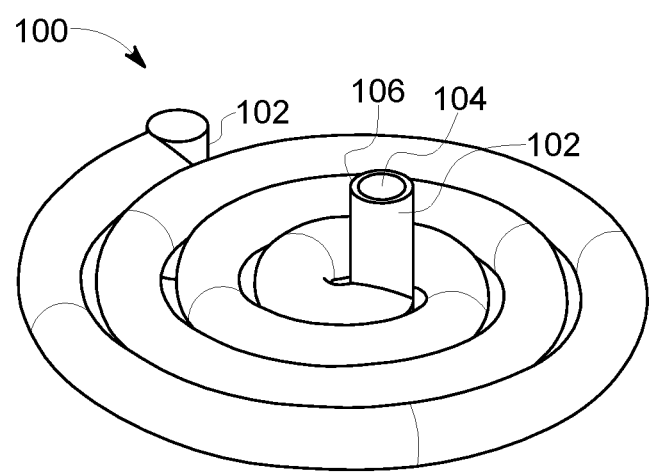
FIG. 5 is a perspective view of the coil made of a scaffold and a plated coating, in accordance with an embodiment.

In other embodiments, the coil 100 may be manufactured by printing a scaffold and then plating (e.g., electroplating) the scaffold. The scaffold may or may not be melted away after plating. FIG. 5 is a perspective view of an embodiment of a coil 100 made of a scaffold 104 and a plated coating 106. The scaffold 104 may be made of a plastic, such as polyester (PES), polyethylene terephthalate (PET), polyethylene (PE), high-density polyethylene (HDPE), polyvinyl chloride (PVC), polyvinylidene chloride (PVDC), low-density polyethylene (LDPE), polypropylene (PP), polystyrene (PS), high impact polystyrene (HIPS), polyamide (PA), acrylonitrile butadiene styrene (ABS), polycarbonate (PC), polyurethane (PU), polyetheretherketone (PEEK), Polytetrafluoroethylene (PTFE), or some other polymer. The scaffold 104 may be printed (e.g., by additive manufacturing), molded, extruded, or manufactured by some other method.

The scaffold 104 may then be electroplated to form the plated coating 106 on the scaffold 104. The plated coating 106 may be copper, silver, gold, tin, zinc, chromium, nickel, platinum, lead, a combination thereof, alloys thereof, or some other conductive metal. In some embodiments, the coil 100 may be heated to melt the scaffold 104, leaving just the plated coating 106. In other embodiments, the coil 100 may be used with the scaffold 104 and the plated coating 106.

Figure 6:
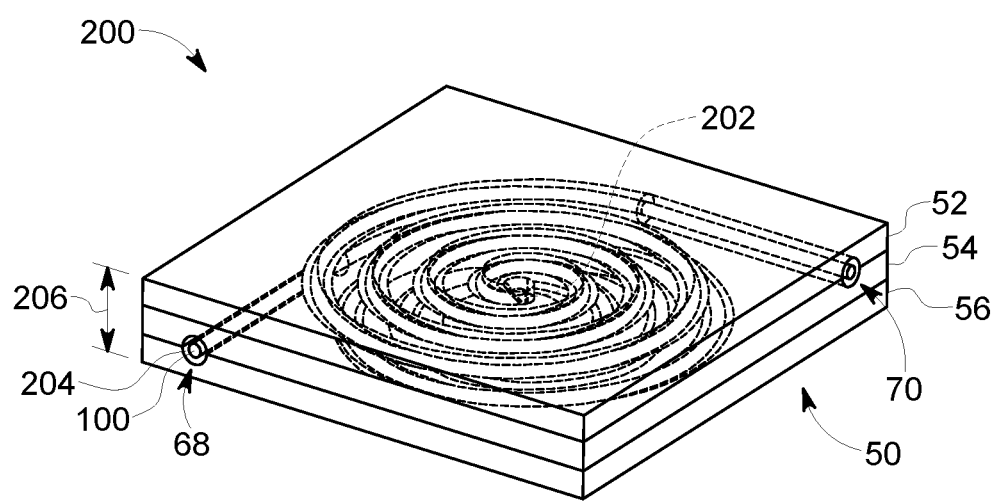
FIG. 6 is a perspective view of the inductor including the core shown in FIG. 2 and two coils shown in FIGS. 3 and 4, in accordance with an embodiment.

FIG. 6 is a perspective view of an embodiment of the inductor 200 including the core 50 shown in FIG. 2 and two coils 100 shown in FIGS. 4 and 5. As shown and described with regard to FIG. 2, the core 50 includes a top layer 52, a middle layer 54, and a bottom layer 56. The layers 52, 54, 56 may be manufactured by additive manufacturing to have a desired magnetic permeability distribution according to the techniques described herein (e.g., comparatively high permeability toward the edges, and reduces magnetic permeability toward the center). As previously described, embodiments of the inductor 200 are envisaged in which the core has multiple middle layers 54. The various layers 52, 54, 56 may be bonded to one another or coupled to one another using an adhesive. The corresponding recessed patterns in surfaces of the various layers 52, 54, 56 that face one another are form passages. The passages are linked to one another by through holes through the various layers 52, 54, 56, forming a continuous passage 204 from the entrance 68 to the exit 70. One or more coils 100 may be disposed within the continuous passage 204. In the illustrated embodiment, the inductor 200 may have a height 206 of less than 1 millimeter. However, embodiments having other heights are possible.

The various components of the inductor 200 may be designed using a computer aided drafting (CAD) program. Performance of the inductor may be simulated with using a finite element analysis (FEA) software (e.g., a EM 3d simulation tool). Based on the results of the FEA, the design may be iteratively improved and optimized to achieve the desired (e.g., uniform or distributed) flux density. Once the design is finalized, the various components of the inductor 200 may be manufactured and assembled. The inductor 200 may then be installed on a printed circuit board (PCB), or otherwise installed in a device. Though presently disclosed embodiments relate to inductors 200, it should be understood that the disclosed techniques may be applied to other electronic components that utilize magnetics, such as transformers.

Figure 7:
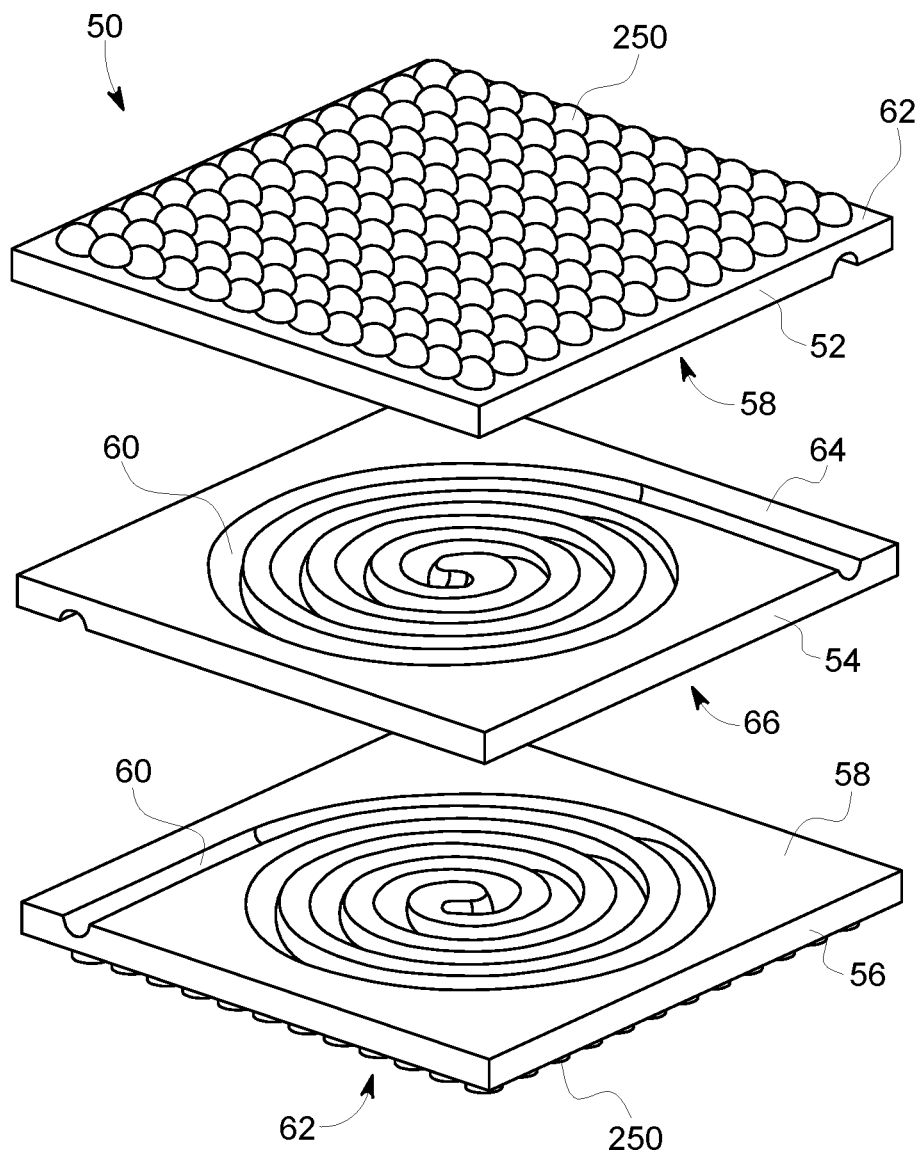
FIG. 7 is an exploded perspective view of an example of the inductor core having hemispherical heat dissipation features, in accordance with an embodiment.
Figure 8:
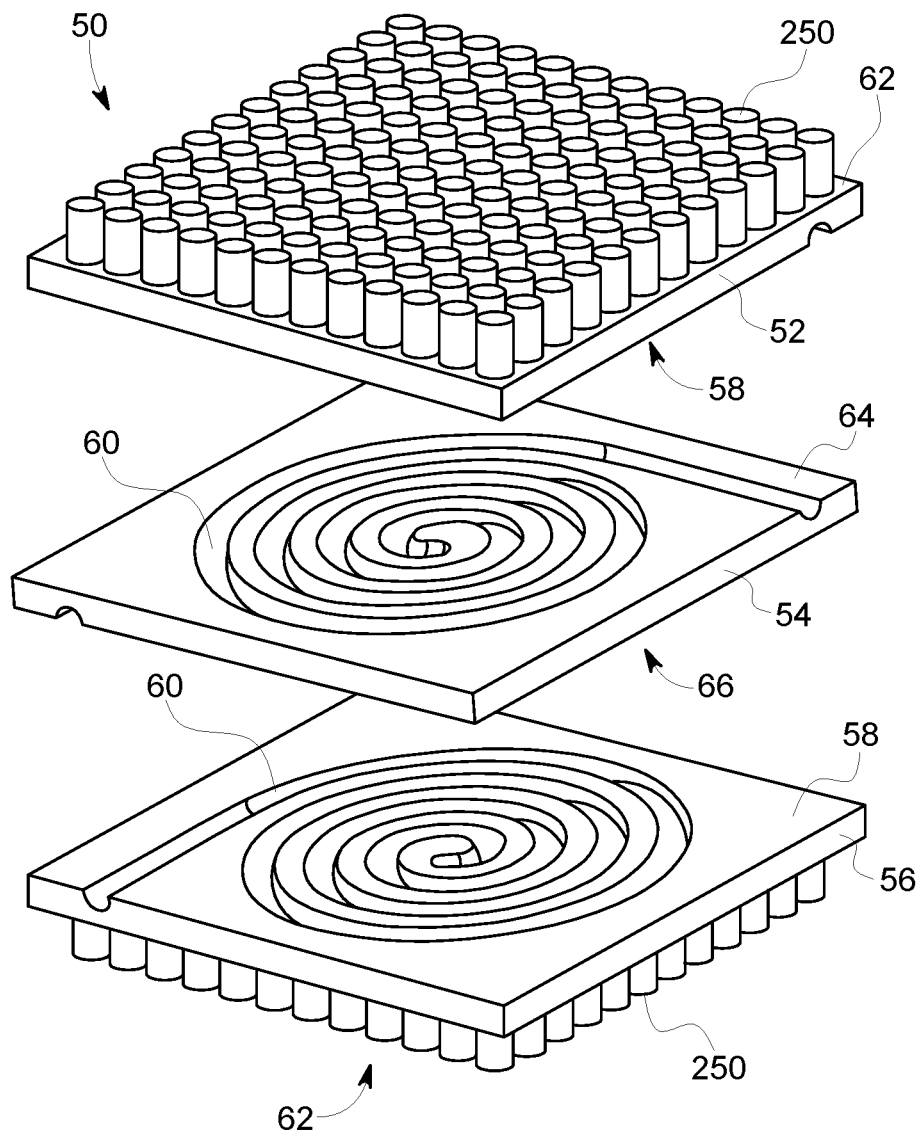
FIG. 8 is an exploded perspective view of an example of the inductor core having cylindrical heat dissipation features, in accordance with an embodiment.

As discussed above, the top and/or bottom layer 52, 56 of the core 50 may include heat dissipation features (e.g., heat sinks) in order to better dissipate heat from the core 50. FIGS. 7 and 8 show two different embodiments of the core 50 including heat dissipation features. FIG. 7 is an exploded perspective view of an example of the inductor core 50 having an array hemispherical heat dissipation features 250. As shown, the exterior surfaces 62 of the top and/or bottom layers 52, 56 may include heat dissipation features 250 (e.g., heat sinks) to aid heat dissipation by increasing surface area. FIG. 8 is an exploded perspective view of an example of the inductor core 50 having cylindrical heat dissipation features 250. Though the heat dissipation features 250 illustrated in FIGS. 7 and 8 are hemispherical and cylindrical, receptively, it should be understood that these are merely examples and that various other forms of heat dissipation features 250 are envisaged. For example, the heat dissipation features 250 may include fins, rectangles, triangles, or any other shape. Similarly, though FIGS. 7 and 8 show heat dissipation features 250 on the exterior surfaces 62 of both the top and bottom layers 52, 56, it should be understood that in some embodiments, the heat dissipation features 250 may be disposed on the exterior surface 62 of either the top layer 52 or the bottom layer 56, but not both.

Figure 9:
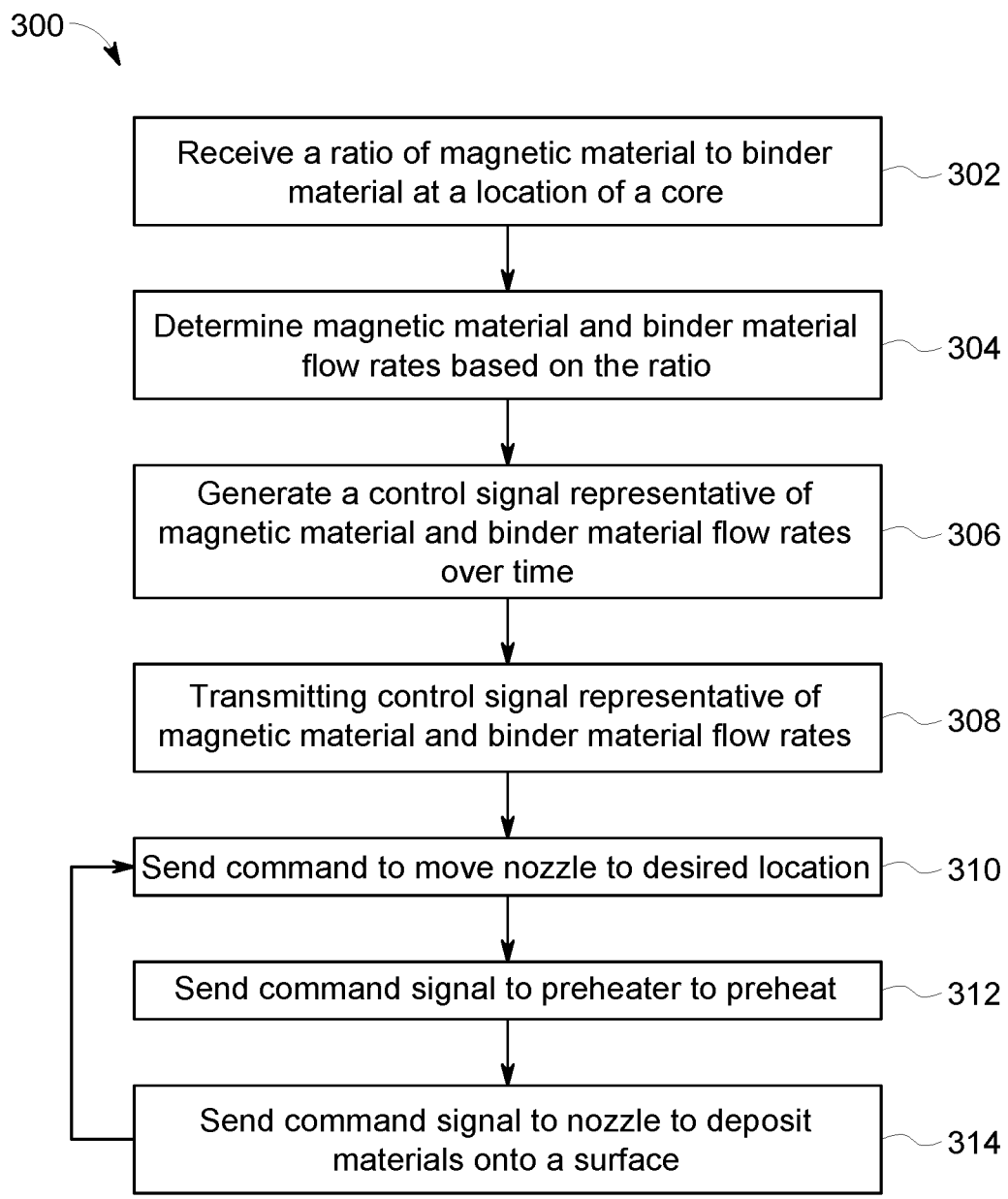
FIG. 9 is a flow chart of a process for manufacturing the inductor core shown in FIG. 2, in accordance with an embodiment.

FIG. 9 is a flow chart of a process 300 for manufacturing the inductor core shown in FIGS. 2 and 3. The following description of the process 300 is described as being performed by the computing device 12, but it should be noted that any suitable processor-type device (e.g., controller 14) may perform the process 300. In block 302, the computing device 12 may receive a ratio of magnetic material to binder material at a given location of the core. In one embodiment, the computing device 12 may receive the ratio of magnetic material to binder material at a given location of the core via a file representative of the core design. The ratio of magnetic material to binder material may represent a desired permeability of the core at a given location. In block 304, the computing device 12 may determine flow rates for the magnetic material and the binder material based, at least in part, on the received ratio of magnetic material to binder material. In block 306, the computing device 12 may generate one or more control signals that represent the respective magnetic material and binder material flow rates over time. The magnetic material and binder material flow rates over time may dictate the ratio of magnetic and binder material at a given location on the core 100.

In block 308, the computing device 12 may transmit the control signal representative of the magnetic material and binder material flow rates to the controller 14, which may control the operations of the magnetic material and binder material supplies.

In block 310, the computing device 12 may send a command to a nozzle to moved to a desired location (e.g., the location corresponding to the determined ratio of magnetic material to binder material). In block 312, the computing device 12 may send a command to the preheater 23 to preheat the magnetic material and the binder material as they flow from the magnetic material supply 16 and the binder material supply 18. As such, the magnetic material and the binder material are mixed by the preheater 22. In block 314, the computing device 12 may send a command to the nozzle to deposit the mixed magnetic binder material onto a surface (e.g., on the XY table 24). The process 300 may then return to block 310 by moving the nozzle to a new location. The process 300 continues until the core has been produced.

Technical effects of the disclosed subject matter include utilizing additive manufacturing techniques to manufacture an inductor core layers having a desired magnetic permeability distribution. When the core layers are assembled with coils disposed between the core layers to form an inductor, the resulting inductor may have a reduced height, volume, and weight, as well as a customizable form factor, without reduced performance (e.g., inductance and/or resistance). Furthermore, the resultant inductor may achieve uniform magnetic flux distribution and the same or increased power density.

This written description uses examples to disclose the subject matter, including the best mode, and also to enable any person skilled in the art to practice the disclosed techniques, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a magnetic material supply comprising a magnetic material supply valve for regulating a magnetic material flow rate of a magnetic material;
   a binder material supply comprising a binder material supply valve for regulating a binder material flow rate of a binder material;
   a nozzle fluidly coupled to the magnetic material supply and the binder material supply for depositing a deposition mixture of the magnetic material and the binder material on a surface;
   a preheater configured to preheat the magnetic material and the binder material before the magnetic material and the binder material are deposited on the surface; and
   a master computing device that comprises a controller and a computing device, the computing device comprising a processor and a memory accessible by the processor, wherein the memory is configured to store an inductor core design file; wherein the controller is in operative communication with the magnetic material supply, the binder material supply, and the preheater, the controller being configured to:
      receive the inductor core design file that represents a geometry and a magnetic permeability distribution of an inductor core;
      move the nozzle to a first deposition location;
      determine a first magnetic permeability of the inductor core at the first deposition location based on the inductor core design file;
      determine a first ratio of the magnetic material flow rate to the binder material flow rate to provide the deposition mixture having the first magnetic permeability; and
      regulate the magnetic material supply and the binder material supply to deposit the deposition mixture having the first ratio at the first deposition location.

2. The system of claim 1, wherein the inductor core design file comprises at least one of a computer-aided design (CAD) file, an OBJ file, a stereolithography (STL) file, a drawing exchange format (DXF) file, or an additive manufacturing file format (AMF) file.

3. The system of claim 1, further comprising:
   a drive mechanism configured to facilitate relative movement between the nozzle and the surface.

4. The system of claim 3, further comprising:
   an XY table that is movable relative to the nozzle, wherein the drive mechanism is mechanically coupled to the XY table and the controller is in operative communication with the drive mechanism for selectively moving the XY table.

5. The system of claim 1, wherein the preheater comprises at least one of a coil, a light source, a resistive element, or a laser.

6. The system of claim 1, wherein the preheater is operably coupled to the nozzle.

7. The system of claim 1, wherein the magnetic material comprises magnetic powder and the binder material comprises epoxy.

8. The system of claim 1, wherein the controller is further configured to:
move the nozzle to a second deposition location;
determine a second magnetic permeability of the inductor core at the second deposition location based on the inductor core design file;
determine a second ratio of the magnetic material flow rate to the binder material flow rate to achieve the deposition mixture having the second magnetic permeability; and
regulate the magnetic material supply and the binder material supply to deposit the deposition mixture having the second ratio at the second deposition location.

9. The system of claim 8, wherein the first deposition location is closer to an edge of the inductor core relative to the second deposition location and the second deposition location is closer to a center of the inductor core relative to the first deposition location, and wherein the first magnetic permeability at the first deposition location is higher than the second magnetic permeability at the second deposition location.

10. The system of claim 1, wherein the inductor core comprises:
a first layer having a first surface, a second surface, and a first recessed pattern extending from the second surface of the first layer toward the first surface of the first layer;
a second layer having a third surface, a fourth surface, a second recessed pattern extending from the third surface of the second layer toward the fourth surface of the second layer, and a third recessed pattern extending from the fourth surface of the second layer toward the third surface of the second layer; and
a third layer having a fifth surface, a sixth surface, and a fourth recessed pattern extending from the fifth surface of the third layer toward the sixth surface of the third layer, wherein the second layer is disposed between the first and third layers.

11. The system of claim 10, wherein the second layer is disposed between the first and third layers such that the second surface of the first layer faces the third surface of the second layer and the fourth surface of the second layer faces the fifth surface of the third layer, wherein the first and second recessed patterns correspond to one another and are configured to receive a coil, and wherein the first, second, and third layers have non-uniform magnetic permeabilities, and wherein the first and second recessed patterns have semi-circular cross-sections, and wherein the first and second recessed patterns are configured to combine to form a passage having a circular cross section when the second surface of the first layer is coupled to the third surface of the second layer.

* * * * *